(12) United States Patent
Lemelin

(10) Patent No.: US 6,533,516 B2
(45) Date of Patent: Mar. 18, 2003

(54) INTERLOCKING SHIM

(76) Inventor: Normand Lemelin, 7911 Carey Rd., Lithia, FL (US) 33547

( * ) Notice: Subject to any disclaimer, the term of this patent is extended or adjusted under 35 U.S.C. 154(b) by 0 days.

(21) Appl. No.: 09/683,570

(22) Filed: Jan. 18, 2002

(65) Prior Publication Data

US 2002/0054810 A1 May 9, 2002

Related U.S. Application Data

(63) Continuation-in-part of application No. 09/547,566, filed on Apr. 12, 2000
(60) Provisional application No. 60/174,573, filed on Jan. 5, 2000.

(51) Int. Cl.[7] .............................................. F16B 43/02
(52) U.S. Cl. ...................... 411/539; 411/531; 411/535; 411/536; 411/546; 411/442; 411/444; 411/445; 206/338; 206/340; 206/354; D8/354
(58) Field of Search ................................ 411/539, 531, 411/535, 536, 546, 442, 444, 445; 206/338, 340; D8/354

(56) References Cited

U.S. PATENT DOCUMENTS

| | | | | | |
|---|---|---|---|---|---|
| 971,897 | A | * | 10/1910 | Keith .......................... | 74/595 |
| 1,721,363 | A | * | 7/1929 | Wesp .......................... | 384/248 |
| 1,915,640 | A | * | 6/1933 | Alsaker ....................... | 411/532 |
| 2,082,577 | A | * | 6/1937 | Herschmann ................ | 206/343 |
| 2,261,416 | A | * | 11/1941 | Schnell ....................... | 411/531 |
| 2,383,135 | A | * | 8/1945 | Lang .......................... | 411/461 |
| 2,417,423 | A | * | 3/1947 | Lang .......................... | 411/458 |
| 2,431,342 | A | * | 11/1947 | Perkins ....................... | 493/462 |
| 2,713,806 | A | * | 7/1955 | Dodge ........................ | 411/536 |
| 2,943,716 | A | * | 7/1960 | Babcock ..................... | 52/653.1 |
| 3,297,916 | A | * | 1/1967 | Wright ....................... | 361/710 |
| 3,346,286 | A | * | 10/1967 | Wescott ..................... | 403/408.1 |
| 3,595,123 | A | * | 7/1971 | Wurzel ....................... | 411/517 |
| 3,813,766 | A | * | 6/1974 | Brock et al. ................ | 29/603.18 |
| D246,346 | S | * | 11/1977 | Strunk ........................ | D8/354 |
| 4,060,301 | A | * | 11/1977 | Beatty ........................ | 339/95 R |
| 4,195,542 | A | * | 4/1980 | Zimmer ...................... | 83/664 |
| 4,485,607 | A | * | 12/1984 | Nelson ....................... | 52/741 |
| 4,558,548 | A | * | 12/1985 | Hieger ........................ | 52/235 |
| 4,775,250 | A | * | 10/1988 | Stewart ...................... | 384/626 |
| 4,805,506 | A | * | 2/1989 | Gosnell ...................... | 83/500 |
| 4,809,421 | A | * | 3/1989 | Justice ....................... | 29/525.1 |
| 4,886,408 | A | * | 12/1989 | Killian et al. ............... | 411/519 |
| 5,197,841 | A | * | 3/1993 | Tanaka ....................... | 411/522 |
| 5,640,813 | A | * | 6/1997 | Glazik et al. ............... | 52/126.1 |
| 5,855,052 | A | * | 1/1999 | Becker et al. .............. | 29/464 |
| 6,058,671 | A | * | 5/2000 | Strickland ................... | 52/580 |
| 6,168,161 | B1 | * | 1/2001 | Majcen ....................... | 277/308 |

FOREIGN PATENT DOCUMENTS

DE          3236161 A1  *  4/1984

OTHER PUBLICATIONS

Maudlin Shim Products. Datasheet [online]. Oct. 2001. Retrieved from the Internet: www.maudlinproducts.com.*
Pruftechnik . Datasheet [online]. 2000. Retrieved from the Internet: www.pruftechnikdirect.com.*
Johnson Packings. Datasheet [online]. Retrieved from the Internet: www.johnpak.com.*

* cited by examiner

Primary Examiner—Anthony Knight
Assistant Examiner—Carlos Lugo

(57) ABSTRACT

An interlocking shim system having interlocking grooves and teeth. The interlocking shim does not require extraneous tools for the process of installation. The system also includes magnets for placing a shim pack in an uneven environment. Since the interlocking shims can be attached to each other through the interlocking groove members the user can manipulate a connected shim pack, by removing the first interlocking shim. There is also a magnet system in the present invention for aligning the bottom shim in mechanical applications without having to scribe the position for correct placement. The shims interlock for easy removal of shim packs.

4 Claims, 3 Drawing Sheets

//INTERLOCKING SHIM

CROSS REFERENCE TO RELATED APPLICATIONS

This is a Continuation-In-Part of application Ser. No. 09/547,566 filed Apr. 12, 2000, which claimed priority to Application No. 60/174,573 filed on Jan. 5, 2000.

BACKGROUND OF INVENTION

The present invention is shim for alignment of machines, or a building structural steel, which has interlocking pieces and magnets to hold certain shims in place.

Any industrial environment requires alignment of mechanical equipment so the machinery can last over time because of precise setting. A common member used for aligning driver to driven of mechanical devices is the pre-cut shim. Shims are used in industrial equipment to eliminate vibrations upon operation. A shim is also needed to level structural steel. Additionally shims can be used to level one piece of machinery with another so the pieces of machinery can be used in conjunction with each other. There are shims available to millwrights' mechanical workers but as will be shown, none of the existent shims have facile installation and do not interlock for a secure fit, as well as having a secure means of holding the bottom shim in place on rough or warped bases.

U.S. Pat. No. 1,492,561 issued to Gabriel on May 6,1924, shows a washer or shim. Gabriel's invention is unlike the present invention because it does not interlock with other washers or shims as the interlocking mechanisms are used to lock one portion of the washer to another. Also, it does not eliminate the need for additional tools to straighten, push or pull the shim and there are no magnet mechanisms included as a means to hold the bottom shim in place.

U.S. Pat. No. 1,558,364 issued to Iverson on Oct. 20, 1925 shows a washer. Iverson's invention is unlike the present invention because it does not interlock with other washers, and it does not have magnet mechanisms to secure a bottom shim.

U.S. Pat. No. 4,558,458 issued to Heiger on Dec. 17, 1985 shows a non-displaceable shim. Heiger's invention is unlike the present invention because it does not have interlocking properties, it does not have magnet mechanisms to hold the bottom placed shims in place, and it is intended to be used in vertical placement and would not function as well in a horizontal placement.

U.S. Pat. No. 4,809,421 issued to Justice on Mar. 7, 1989 shows a slotted shim. Justice's invention is unlike the present invention because additional tools are needed to straighten, or adjust the shim, and there are no magnet mechanisms to keep the bottom shim in place. Also Justice's invention requires a tab system as a means of removal of the shims. Therefore a need has been established for an interlocking shim, using magnet mechanisms, that does not require extraneous tools to place or remove in a mechanical setting.

SUMMARY OF INVENTION

The present invention is an interlocking shim system for use in industrial situations to align machinery to another piece of machinery. In Industrial environments often have the need to align one piece of machinery with another so the machines can operate without vibrations at high RPM's in conjunction with each other, and the present invention allows machinists to level two pieces of machinery, without the use of extra tools. The present invention has a magnet system to secure the bottom interlocking shims, to provide a secure fit around the bottom of a machine post or leg support. The magnet system securely holds the bottom interlocking system in place without having to scribe the position of the shims, and without having to hope to position shim pack at the same place. Also the magnet pieces allow the shims to function properly without shifting through the alignment process of the machinery.

The present invention can be constructed of any smooth and strong material which will react to magnetic properties. The present invention can be produced in any variety of lengths, and widths to meet different shim needs. The interlocking shim system can be used in a vertical or horizontal placement with equal success.

DETAILED DESCRIPTION

The present invention is an interlocking shim system for industrial environments.

The present invention is one congruous piece of metal in a "C" shape used forleveling machinery in industrial environments. The shim system has interlocking teeth at the base of the "C" shape and at the first and second extension ends. The present invention also has triangular magnet pieces to assist the user in locking a bottom shim to facilitate alignments.

Figure 1:
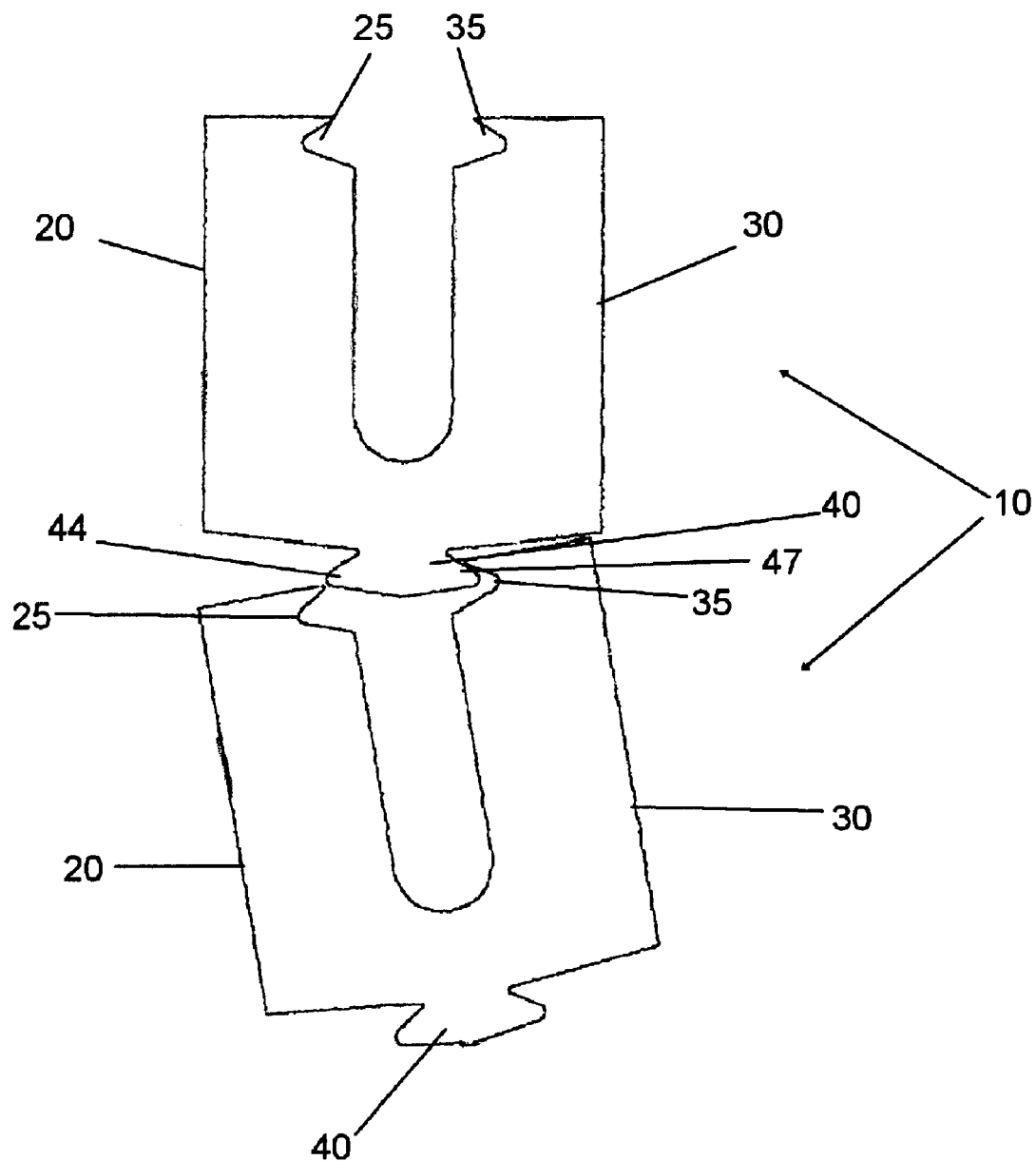
FIG. 1 shows a top view of the present invention, showing the interlocking mechanism.

As is shown in FIG. 1, the interlocking shim (10) has first and second extension arms (20, 30), which are of symmetrical lengths, widths and depths. At the end of first and second extension arms (20,30) are first and second interlocking grooves (25, 35). At the base of the interlocking shim (10) is an interlocking tooth. The interlocking tooth (40) has third and fourth interlocking groove members (44,47). As is shown the interlocking tooth (40) fits in a secure yet removable manner to the first and second interlocking grooves (25, 35), by use of the third and fourth interlocking groove members (44, 47).

Figure 2:
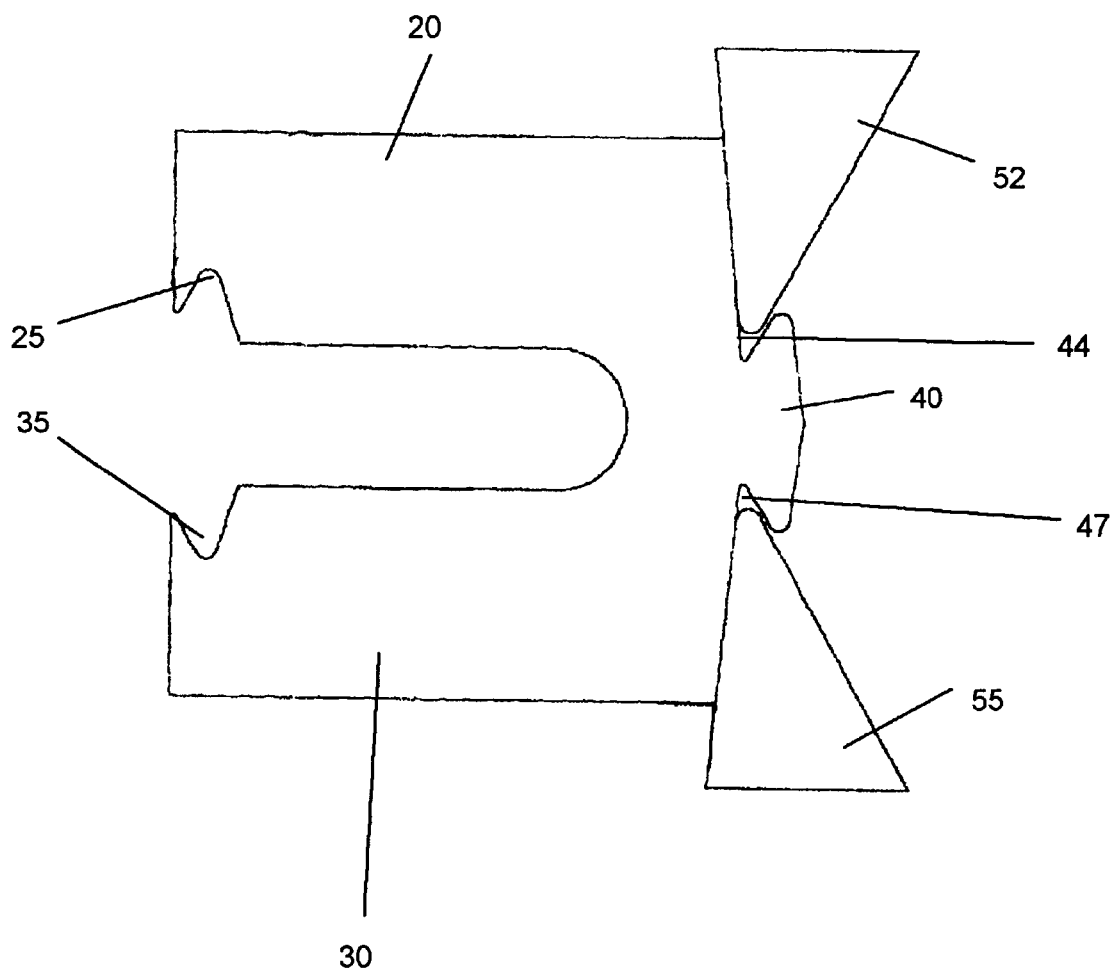
FIG. 2 shows a top view of the shim with the magnetic pieces.

Turning to FIG. 2, we see the first and second triangular magnet pieces (52,55) which are shaped to easily fit into the third and fourth interlocking members (44,47). The first and second triangular magnet pieces (52, 55) are used with the interlocking shim (10) to even the interlocking shim (10) on uneven surfaces. For example, shims are often used to even out machinery that must be aligned with another piece of machinery, or to fill a gap in an engine or motor. Often the spaces that a shim would need to fill are uneven surfaces, and the first and second triangular magnet pieces (52, 55) allow the user to position the interlocking shim (10) in the preferred position without having to scribe the position. The first and second triangular magnet pieces (52, 55) are removed once the user has properly placed the interlocking shim (10).

Possible uses for the interlocking shim (10) include but are not limited to front end alignment in a motorized vehicle, any mechanical motor, a machine that needs to be level with another machine, structural steel building, a railroad mechanical sub assembly train tracks or engines. Any industrial machinery that may need a shim for leveling or separation of parts can use a version of the interlocking shim (10).

One example of a use of the interlocking shim (10) would include front end alignment for an automobile, or like engine. The interlocking shim (10) could be placed under the conventional spring mechanism in the engine to stabilize the spring to a certain tension when the engine is not functioning, which ensures that the spring holds the correct tensions and the shock system can function properly.

In structural steel applications, the interlocking shim (10) can space one support from another, and even out uneven building materials. The interlocking shim (10) can easily be inserted in a horizontal, vertical, or diagonal positions depending on the needed use.

Since the interlocking shim (10) can be fixed to another interlocking shim (10) you can push or pull the second interlocking shim (10) by moving the first interlocking shim (10). this allows the user to easily readjust the shims or shim packs (10) if needed without use of extraneous tools. The interlocking shim (10) also does not need additional bolts or fasteners to be held into position. The interlocking means of the first, second, third, and fourth interlocking members (25, 35, 44, 47) and the interlocking tooth (40) allow the user to easily configure the interlocking shims (10) as needed without having to scribe the position. The preferred metal of fabrication for the interlocking shim (10) is stainless steel due to the inherent strength and corrosion properties of steel. However brass and other like metals can be used for production of the interlocking shims (10) depending on intended use.

Figure 3:
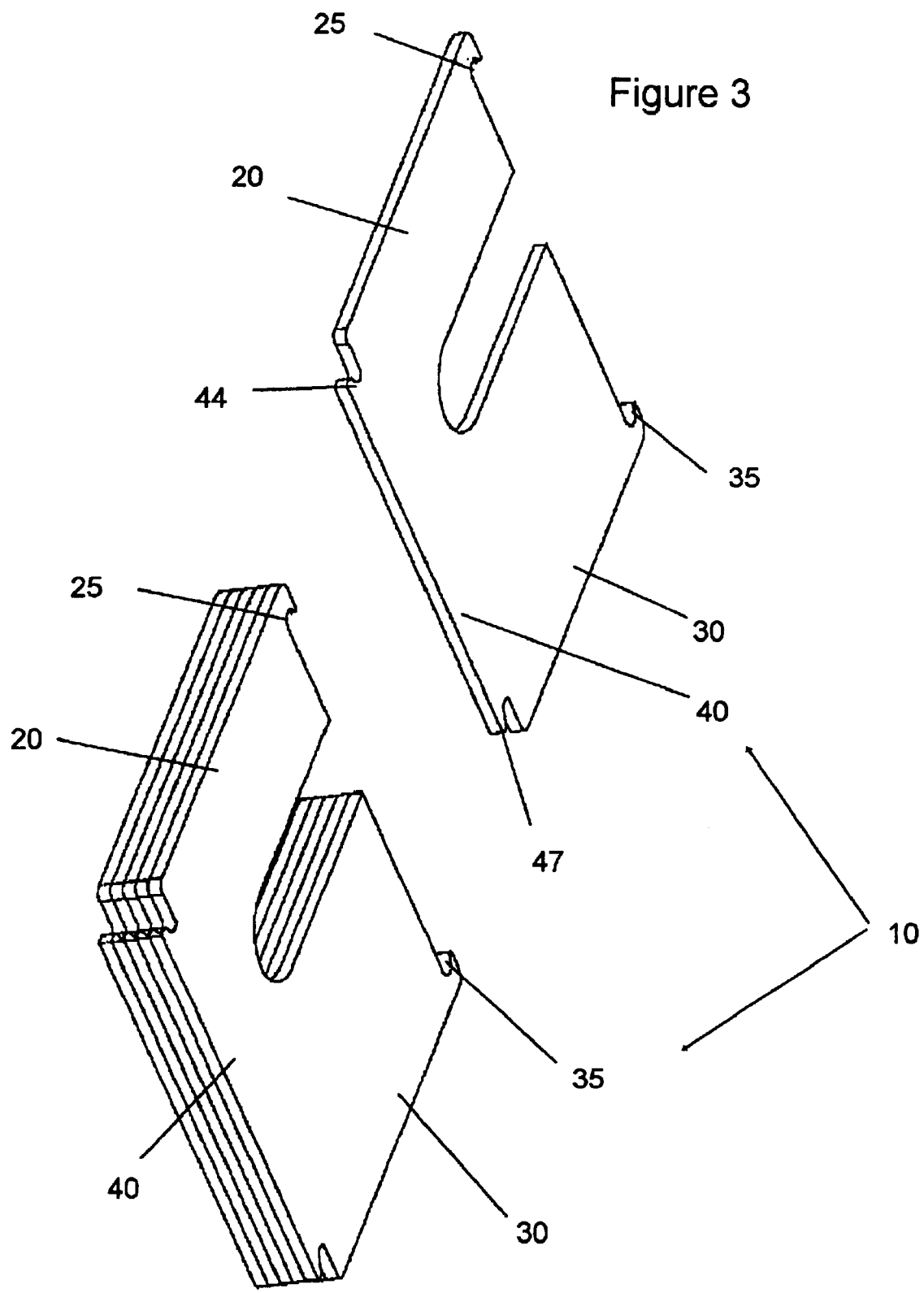
FIG. 3 shows a side view of the tabless interlocking shim pack and an interlocking shim.

FIG. 3 shows a side view of the tabless interlocking shim pack (10) and an interlocking shim (10). The first, second third and fourth interlocking members (25,35,44,47) and the interlocking tooth (40) are shown and function in the same manner described above. The interlocking shim pack (10) can be constructed of any number of interlocking shims (10) placed in a congruous stack, to align a piece of machinery or to compensate for uneven flooring.

The present invention is not limited to the sole embodiments described above, but encompasses any and all embodiments of the following claims.

What is claimed is:

1. An interlocking shim system comprising:

at least a first and second identical shims, each shim including:

two extension arms having first and second ends;

an interlocking groove located at said first end of each of said extensions arms;

a first interlocking tooth located on said second end of said extensions arms;

wherein said interlocking grooves located on each of said extensions arms of said first shim are capable of matingly receiving said interlocking tooth of said second shim.

2. A system according to claim 1 wherein said interlocking tooth joints two of said extensions arms.

3. A system according to claim 2 wherein said extensions arms and said interlocking tooth form a "C" shape.

4. A system according to claim 3 wherein the system further includes at least two triangular magnet pieces to be positioned on said interlocking grooves located on said second end of said extensions arms to held said first shim.

* * * * *